(12) United States Patent
Valouch et al.

(10) Patent No.: US 12,656,175 B2
(45) Date of Patent: Jun. 16, 2026

(54) PORTABLE SPECTROMETER DEVICE

(71) Applicant: TRINAMIX GMBH, Ludwigshafen am Rhein (DE)

(72) Inventors: Sebastian Valouch, Ludwigshafen am Rhein (DE); Michael Hanke, Ludwigshafen am Rhein (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 78 days.

(21) Appl. No.: 18/723,517

(22) PCT Filed: Jan. 25, 2023

(86) PCT No.: PCT/EP2023/051724
§ 371 (c)(1),
(2) Date: Jun. 24, 2024

(87) PCT Pub. No.: WO2023/144161
PCT Pub. Date: Aug. 3, 2023

(65) Prior Publication Data
US 2025/0060250 A1 Feb. 20, 2025

(30) Foreign Application Priority Data
Jan. 26, 2022 (EP) ..................................... 22153478

(51) Int. Cl.
*G01J 3/28* (2006.01)
*G01J 3/02* (2006.01)

(52) U.S. Cl.
CPC ............. *G01J 3/027* (2013.01); *G01J 3/0272* (2013.01); *G01J 3/0297* (2013.01); *G01J 3/28* (2013.01)

(58) Field of Classification Search
CPC .. G01J 3/02; G01J 3/027; G01J 3/0272; G01J 3/0297; G01J 3/28
See application file for complete search history.

(56) References Cited

U.S. PATENT DOCUMENTS

| | | | | |
|---|---|---|---|---|
| 5,040,889 A | | 8/1991 | Keane | |
| 9,360,366 B1 * | | 6/2016 | Tran ...................... | G01J 3/0264 |

(Continued)

FOREIGN PATENT DOCUMENTS

| | | | |
|---|---|---|---|
| DE | 102019219945 A1 | 6/2021 | |
| EP | 3460509 A1 | 3/2019 | |

(Continued)

OTHER PUBLICATIONS

Ibsen Photonics: "Technical Note—Subtracting dark spectra", available online under https://ibsen.com/wp-content/uploads/Tech-Note-Short-note-on-subtracting-dark-spectra-v1.0-1.pdf, 4 pages.

(Continued)

*Primary Examiner* — Abdullahi Nur
(74) *Attorney, Agent, or Firm* — Armstrong Teasdale LLP

(57) ABSTRACT

Disclosed herein is a portable spectrometer device for acquiring at least one item of spectral information. The portable spectrometer device includes at least one spectrometer unit. The spectrometer unit includes at least one wavelength-selective element configured for separating incident light into a spectrum of constituent wave-lengths and at least one detector device configured for detecting at least a portion of the constituent wavelengths. The portable spectrometer device further includes at least one control unit and at least one status inquiry device configured for retrieving at least one item of status information on a current environmental status of the portable spectrometer device. The control unit is configured for automatically triggering at least one reference measurement with the detector device, depending on the fulfillment of at least one predetermined environmental status condition.

15 Claims, 1 Drawing Sheet

(56)  References Cited

U.S. PATENT DOCUMENTS

Figures 1, 2:
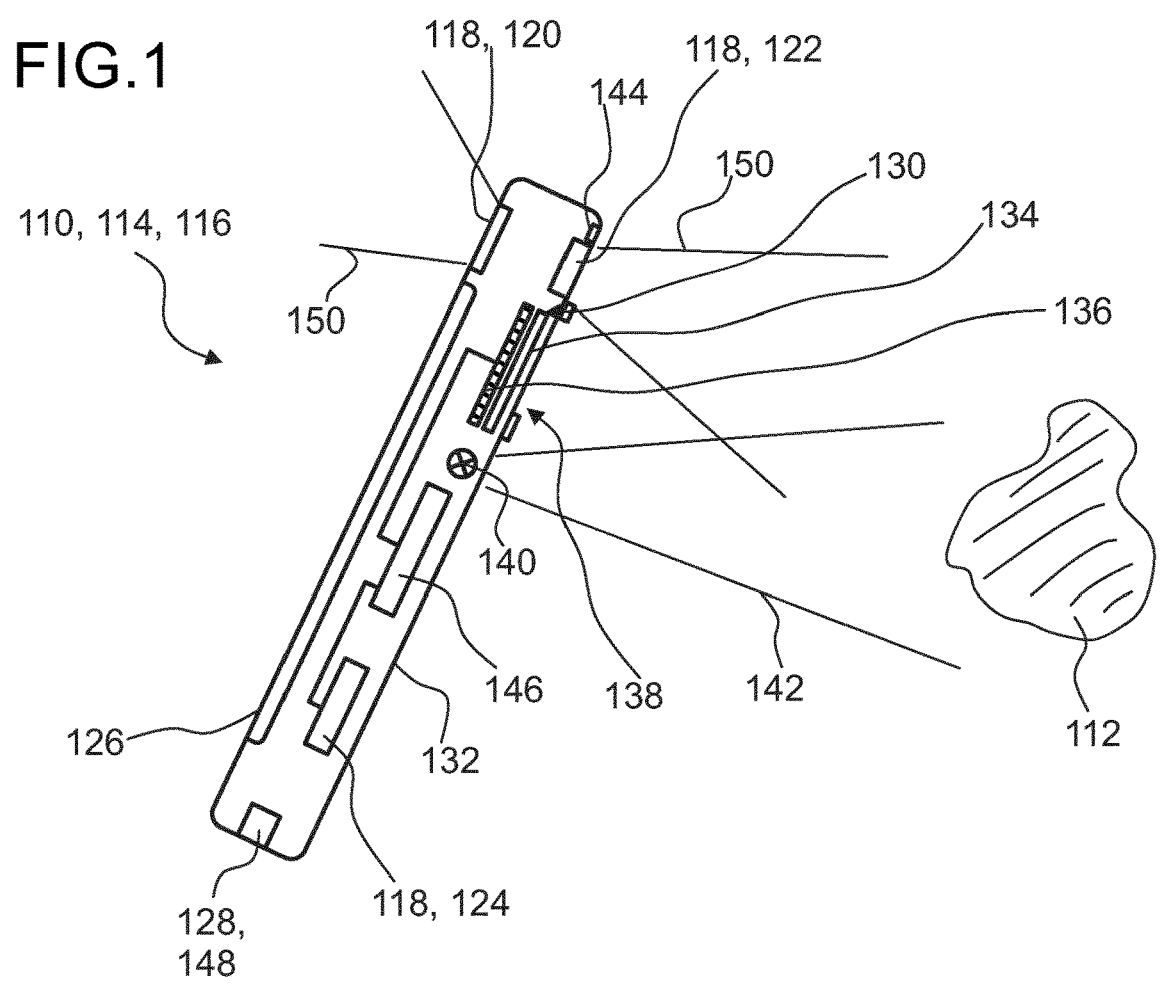

| | | | | |
|---|---|---|---|---|
| 2004/0195511 | A1* | 10/2004 | Elmore | G01N 21/3563 |
| | | | | 250/339.02 |
| 2018/0058929 | A1* | 3/2018 | Ramer | G01J 3/42 |
| 2018/0088316 | A1* | 3/2018 | Matsushita | G01J 3/42 |
| 2018/0184972 | A1 | 7/2018 | Carmi et al. | |
| 2018/0313690 | A1* | 11/2018 | Hruska | G01N 21/274 |
| 2020/0271572 | A1 | 8/2020 | Knudtson | |

FOREIGN PATENT DOCUMENTS

| | | | |
|---|---|---|---|
| WO | 2018203831 | A1 | 11/2018 |
| WO | 2019115594 | A2 | 6/2019 |

OTHER PUBLICATIONS

"Seek Thermal Compact" (www.thermal.com/compact-series.html), 22 pages.
Tempelhahn et al., "Shutter-less calibration of uncooled infrared cameras", J. Sens. Sens. Syst., vol. 5, pp. 9-16 (2016).
International Search Report for PCT/EP2023/051724 dated Mar. 15, 2023, 4 pages.
Written Opinion for PCT/EP2023/051724 dated Mar. 15, 2023, 14 pages.

* cited by examiner

PORTABLE SPECTROMETER DEVICE

CROSS-REFERENCE TO RELATED APPLICATIONS

This application is a U.S. National Phase Application of International Patent Application No. PCT/EP23/51724, filed Jan. 25, 2023, which claims priority to EP Patent Application No. 22153478.7, filed Jan. 26, 2022, each of which is hereby incorporated by reference herein.

TECHNICAL FIELD

The present invention relates to a portable spectrometer device for acquiring at least one item of spectral information, e.g. on an object or a plurality of objects. Further, the present invention relates to a method of performing reference measurements with the portable spectrometer device, and to a computer program and a computer-readable storage medium comprising instructions for performing the method. The method and devices can, in particular, be used for calibrating spectrometer devices used for infrared spectroscopy using mobile devices such as smart phones, specifically in the near infrared and the mid infrared spectral regions. However, other uses are also feasible.

BACKGROUND ART

Spectrographic methods are widely used in research, industry and customer applications, enabling multiple applications such as optical analysis and/or quality control. Use cases can be found, for example, in the fields of food production and quality control, farming, pharma, medical applications, life sciences and many more. Various methods are available, such as photometry, absorption, fluorescence and Raman spectrometry, enabling qualitative and/or quantitative sample analysis. These methods usually involve acquiring at least one item of spectral information, by using at least one spectrometer device having at least one wavelength-selective element and at least one detector device. Various types of spectrometer devices, which may also be used in the context of the present invention, specifically in the spectrometer unit as described in further detail below, are disclosed e.g. in WO 2019/115594A2. It shall be noted, however, that other types of spectrometers are also applicable in the context of the present invention.

In order to provide for reliable results and long-term stability of spectroscopic measurements, the spectrometer devices typically require reference measurements on a routine basis. Thus, for example, reference measurements may be conducted in regular intervals to counter the effect of drift or other long-term changes.

Under well-defined laboratory conditions, reference measurements typically may be performed by using at least one reference target having known properties, which may be located in front of an open aperture or spectrometer port of the spectrometer device. Additionally or alternatively, one or more reference light sources or reference light paths may be used, by which reference light having known properties is provided to the detector device. Thus, as an example, a reference light path may be provided that contributes reference light during every measurement and/or during reference measurement cycles.

WO 2018/203831 A1 discloses that calibrating a spectrometer module includes performing measurements using the spectrometer module to generate wavelength-versus-operating parameter calibration data for the spectrometer module, performing measurements using the spectrometer module to generate optical crosstalk and dark noise calibration data for the spectrometer module, and performing measurements using the spectrometer module to generate full system response calibration data, against a known reflectivity standard, for the spectrometer module. The method further includes storing in memory, coupled to the spectrometer module, a calibration record that incorporates the wavelength-versus-operating parameter calibration data, the optical crosstalk and dark noise calibration data, and the full system response calibration data, and applying the calibration record to measurements by the spectrometer module.

EP 3 460 509 A1 discloses a method for calibrating a time-of-flight system having a time-of-flight sensor located behind a cover plate (CP). The method involves emitting a plurality of sending pulses (EP) of light in response to respective trigger pulses of a control signal (CS1) and detecting received pulses of light (RP, RP'). Respective difference values are determined which are representative of a time period between one of the sending pulses (EP) and one of the received pulses (RP, RP'). The difference values are accumulated into a number of bins (1, . . . , N) of at least one histogram. The method further involves recording at least one crosstalk response (CTP) in the histogram within a predetermined range of bins (1, . . . , M), and calibrating the histogram using the recorded crosstalk response (CTP). Finally, an output signal (OS) is generated which is indicative of a time-of-flight based on an evaluation of the calibrated histogram.

US 2018/184972 A1 discloses a system for analyzing body fat level in human body. The system comprises a spectrometer, for example a handheld spectrometer, configured to generate spectral data from one or more locations on the body of a tested subject and a processor configured to receive the spectral data using models and output body fat levels of the tested subject.

DE 10 2019 219945 A1 provides a method of operating a spectrometer device. The method comprises connecting the energy storage device to a charging device, determining a first temperature at the spectrometer device; determining a first reference spectrum on a reference material at the first temperature; determining a second temperature at the spectrometer means during or after loading; determining a second reference spectrum with the spectrometer means at the reference material at the second temperature; comparing the reference spectra and performing a compensation of the determined difference in a determined spectrum.

US 2020/271572 A1 describes an embodiment of a method of automatically generating a background measurement in a spectrometer. The method comprises the steps of: collecting a plurality of candidate scans in the spectrometer; determining for each of the plurality of candidate scans if the candidate scan correlates to an orthonormal basis set that is associated with a recent background description; saving each candidate scan that correlates to the orthonormal basis set as a background scan in a scan cache; and generating a new background measurement from a plurality of the background scans stored in the scan cache if a current background measurement is older than a preselected time interval.

U.S. Pat. No. 5,040,889 A discloses a fiber optic probe, provided in an optical instrument, to irradiate a sample with visible NIR and ultraviolet light. Glass fibers carry the visible and NIR light to the probe from a visible and NIR light source and quartz fibers carry ultraviolet light to the probe from an ultraviolet source. Glass fibers carry visible and NIR light emanating from the sample to a spectrometer having a fixed grating and an array of photo-detectors to receive the spectrum dispersed by the grating within the spectrometer housing. Amplifiers are also contained in the spectrometer housing severally connected to the photode-tectors to amplify the output signals of the photodetectors. The probe is provided with a standard white sample pivotal into position to receive the light from the visible light source. A computer is programmed to provide automatic calibrating whenever the temperature within the housing changes more than a predetermined small amount. The automatic calibration is carried out by pivoting the white standard into position and computing calibration values from the resulting photodetector outputs. Automatic calibra-tion is also provided when the ratio of output signals from selected ones of the photodetectors changes by more than a predetermined small percentage.

The results of the reference measurements may be used as standards or for normalization purposes. Thus, as an example, the reference measurements may provide for ref-erence measurement signals or reference measurement data which may be used to correct offsets and/or as a standard, for comparison or for normalization purposes when performing measurements with real samples. Therein, typically, at least two main reference measurement methods are generally used: So-called "open port" reference measurements and so-called "dark" reference measurements. In open port ref-erence measurements, a light source, e.g. a light source of the spectrometer device, is switched on when no object is located in front of the sensor, and spectral information is acquired. For dark reference measurements, the light source may be switched off, and spectral information is acquired. In both cases, reference measurement signals may be acquired which may be used in subsequent measurements, such as the dark reference measurement for eliminating an offset and the open port reference measurement for normalizing the mea-surement results. Subtracting dark reference measurement results from actual measurements is generally known to the skilled person, as described, e.g., in Ibsen Photonics: "Tech-nical Note-Subtracting dark spectra", available online under https://ibsen.com/wp-content/uploads/Tech-Note-Short-note-on-subtracting-dark-spectra-v1.0-1.pdf.

These methods of performing reference measurements, however, typically require either active user interaction or at least the a priori information that during the reference measurement the spectrometer device is in a well-defined state. Thus, under laboratory conditions, the open spectrom-eter port of the spectrometer device typically is placed far away from any potentially reflecting surface. Further, under laboratory conditions, the user typically makes sure that no light sources in the relevant wavelength range are present within the field of view of the spectrometer device.

While these reference measurement conditions are widely practicable under laboratory conditions, an increasing num-ber of spectral measurements has to be performed in the field, by using portable spectrometer devices. Establishing reference conditions in the field may require the user's support and a user interaction with the portable spectrometer device which in many cases is undesirable for practical purposes and reasons of convenience.

One option for convenient reference measurements with portable spectrometer devices are continuous reference mea-surements. As an example, the mobile phone-attached spec-trometer device "Seek Thermal Compact" (www.thermal-.com/compact-series.html) is configured for performing continuous reference measurements in regular time inter-vals, by using an integrated shutter as an integrated reference target. A similar principle is also described in A. Tempelhahn et al., "Shutter-less calibration of uncooled infrared cam-eras", J. Sens. Sens. Syst., 5, 9-16, 2016, available online under https://jsss.copernicus.org/articles/5/9/2016/. The use of a shutter, however, requires additional movable mechani-cal elements in the spectrometer device which often is undesirable, specifically in highly compact portable spec-trometer devices.

Thus, despite the progress which has been made in the field of mobile spectroscopy over the recent years, several challenges remain. Specifically, means and methods are still desired which increase reliability, accuracy and long-term stability of the measurements.

Problem to be Solved

It is therefore desirable to provide means and methods which address the above-mentioned technical challenges in the field of mobile spectroscopy. Specifically, means and methods shall be provided which allow for highly reliably and long-term stable mobile spectroscopic measurements requiring a minimum user interaction and minimum effort.

SUMMARY

This problem is addressed by a portable spectrometer device, a method of performing reference measurements with the portable spectrometer device, a computer program and a computer-readable storage medium, with the features of the independent claims. Advantageous embodiments which might be realized in an isolated fashion or in any arbitrary combinations are listed in the dependent claims as well as throughout the specification.

As used herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically are used only once when introducing the respective feature or element. In most cases, when referring to the respective feature or element, the expressions "at least one" or "one or more" are not repeated, notwithstanding the fact that the respective feature or element may be present once or more than once.

Further, as used herein, the terms "preferably", "more preferably", "particularly", "more particularly", "specifi-cally", "more specifically" or similar terms are used in conjunction with optional features, without restricting alter-native possibilities. Thus, features introduced by these terms are optional features and are not intended to restrict the scope of the claims in any way. The invention may, as the skilled person will recognize, be performed by using alter-native features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, a portable spectrometer device for acquiring at least one item of spectral information is disclosed. The spectrometer device comprises at least one spectrometer unit. The spectrometer unit comprises at least one wavelength-selective element configured for separating incident light into a spectrum of constituent wavelengths and at least one detector device configured for detecting at least a portion of the constituent wavelengths. The portable spectrometer device further comprises at least one control unit and at least one status inquiry device configured for retrieving at least one item of status information on a current environmental status of the portable spectrometer device. The control unit is configured for automatically triggering at least one reference measurement with the detector device, depending on the fulfillment of at least one predetermined environmental status condition.

The term "spectrometer device" as used herein is a broad term and is to be given its ordinary and customary meaning to a person of ordinary skill in the art and is not to be limited to a special or customized meaning. The term specifically may refer, without limitation, to acquiring at least one item of spectral information on at least one object. Specifically, the at least one item of spectral information may refer to at least one optical property or optically measurable property which is determined as a function of a wavelength, for one or more different wavelengths. More specifically, the at least one item of spectral information may relate to at least one property characterizing at least one of a transmission, an absorption, a reflection and an emission of the at least one object. The at least one optical property, may be determined for one or more wavelengths. The spectrometer device specifically may form an apparatus which is capable of recording the signal intensity with respect to the corresponding wavelength of a spectrum or a partition thereof, such as a wavelength interval, wherein the signal intensity may, preferably, be provided as an electrical signal which may be used for further evaluation.

As an example, the at least one spectrometer device may comprise at least one light source which, as an example, may be at least one of a tunable light source, a light source having at least one fixed emission wavelength and a broadband light source. Thus, generally, the portable spectrometer device may comprise at least one light source, specifically at least one light source, for illuminating at least one object to be analyzed by spectrometry with light, more specifically with infrared light, and more specifically with near infrared light. The term "light source" as used herein is a broad term and is to be given its ordinary and customary meaning to a person of ordinary skill in the art and is not to be limited to a special or customized meaning. The term specifically may refer, without limitation, to an arbitrary element, device or a combination of devices, which are capable for emitting light. As an example and as will be outlined in further detail below, the light source may comprise at least one thermal light source, such as at least one incandescent lamp, and/or may comprise at least one semiconductor light source, such as at least one light-emitting diode (LED). More specifically, the light source may comprise at least one infrared light emitting diode and/or at least one infrared incandescent lamp. Other examples are possible. The at least one light source may be integrated into the spectrometer unit. Additionally or alternatively, however, one or more other light sources may be used which are integrated into the portable spectrometer device. Thus, as an example, at least one light source integrated into a mobile communication device, such as a smart phone may be used also for the purpose of spectrometry.

The spectrometer unit, as will be outlined in further detail below, further comprises at least one detector device configured for detecting light, such as light which is at least one of transmitted, reflected or emitted from the at least one object. As an example, light emitted by the at least one optional light source of the portable spectrometer device may be one or more of scattered and reflected by an object to be analyzed and of which spectral information is to be gathered, and may be detected by the detector device of the spectrometer unit.

The spectrometer unit further comprises at least one wavelength-selective element, such as a grating, a prism and a filter, e.g. a length variable filter having varying transmission properties over its lateral extension. The wavelength-selective element may be used for separating incident light into a spectrum of constituent wavelength signals whose respective intensities are determined by employing the detector device such as a detector device having an array as described below in more detail.

The term "portable" as used herein is a broad term and is to be given its ordinary and customary meaning to a person of ordinary skill in the art and is not to be limited to a special or customized meaning. The term specifically may refer, without limitation, to the property of at least one object of being moved by human force, such as by a single user. Specifically, the object characterized by the term "portable" may have a weight not exceeding 10 kg, specifically not exceeding 5 kg, more specifically not exceeding 1 kg or even not exceeding 500 g. Additionally or alternatively, the dimensions of the object characterized by the term "portable" may be such that the object extends by no more than 0.3 m into any dimension, specifically by no more than 0.2 m into any dimension. The object, specifically, may have a volume of no more than 0.03 $m^3$, specifically of no more than 0.01 $m^3$ or even no more than 0.001 $m^3$.

The term "item of spectral information" as used herein is a broad term and is to be given its ordinary and customary meaning to a person of ordinary skill in the art and is not to be limited to a special or customized meaning. The term specifically may refer, without limitation, to an item of information, e.g. on at least one object and/or radiation emitted by at least one object, characterizing at least one optical property of the object, more specifically at least one item of information characterizing, e.g. qualifying and/or quantifying, at least one of a transmission, an absorption, a reflection and an emission of the at least one object. As an example, the at least one item of spectral information may comprise at least one intensity information, e.g. information on an intensity of light being at least one of transmitted, absorption, reflected or emitted by the object, as a function of a wavelength over one or more wavelengths, e.g. over a range of wavelengths.

The term "spectrometer unit" as used herein is a broad term and is to be given its ordinary and customary meaning to a person of ordinary skill in the art and is not to be limited to a special or customized meaning. The term specifically may refer, without limitation, to a device, a unit, or a component of another device which is capable of acquiring the at least one item of spectral information as defined above. Specifically, the portable spectrometer device may, as outlined above, be configured for serving one or more different purposes than acquiring the at least one item of spectral information, wherein the spectrometer unit specifically denotes the part of the spectrometer device which is configured for determining the at least one item of spectral information. The spectrometer unit may contain a single piece unit, or may contain a plurality of in-teracting units.

As outlined above, the spectrometer unit comprises at least two components, i.e. the at least one wavelength-selective element configured for separating incident light into a spectrum of constituent wavelengths and the at least one detector device configured for detecting at least a portion of the constituent wavelengths. The separation may, as outlined above, include e.g. a separation by a grating, a prism, a filter or the like.

The term "wavelength-selective element" as used herein is a broad term and is to be given its ordinary and customary meaning to a person of ordinary skill in the art and is not to be limited to a special or customized meaning. The term specifically may refer, without limitation, to a device or a combination of devices capable of performing a spectral separation of components of incident light, whereby the spectrum of constituent wavelengths is generated, i.e. light in which the spectral components are spatially resolved or resolved, e.g. by angle. As an example, the at least one wavelength-selective element may be or may comprise at least one of: a filter, such as a length variable filter, a single wavelength bandpass, an array of bandpass filters; a prism; a grating. Specifically, the at least one wavelength-selective element may comprise one or more filters, such as discrete filters, configured for providing well-defined spectral portions of the incident light to dedicated light-sensitive elements.

The term "detector device" as used herein is a broad term and is to be given its ordinary and customary meaning to a person of ordinary skill in the art and is not to be limited to a special or customized meaning. The term specifically may refer, without limitation, to a device which is configured for measuring at least one measurable property of at least one object. The detector specifically may be or may comprise at least one optical detector configured for measuring at least one optical property of at least one object. The detector device specifically may comprise at least one photosensitive element. More specifically, the detector device may comprise at least one detector array. As an example, the wavelength-selective element may comprise one or more filters, such as single wavelength bandpass filters and/or an array of bandpass filters and/or a length variable filter, the filters being disposed on top of the array of the detector device, such that each light-sensitive element of the detector device is assigned to a respective filter having a different transmission spectrum. Consequently, each light-sensitive element of the detector device detects a different spectral portion of the incident light. Other embodiments, however, are also feasible.

The portable spectrometer device, and more specifically the spectrometer unit, may further comprise one or more additional components. Specifically, the portable spectrometer device and/or the spectrometer unit may comprise at least one light source. Thus, specifically, the portable spectrometer device may comprise at least one infrared light source, more specifically at least one light source emitting in the near infrared spectral range. The light source may be or may comprise at least one broadband light source and/or may be or may comprise at least one light source emitting at one or more isolated wavelengths. The light source may be or may comprise, as an example, a thermal light source such as a broadband emitter like an incandescent lamp. Additionally or alternatively, the light source may be or may comprise one or more semiconductor light sources such as one or more light-emitting diodes. Further, additionally or alternatively, the light source may be or may comprise one or more lasers. Other options are also feasible. The light source may be configured for illuminating at least one object within a field of view of the portable spectrometer device with light, specifically with infrared light.

As also outlined above, the portable spectrometer device further comprises at least one control unit. The term "control unit" as used herein is a broad term and is to be given its ordinary and customary meaning to a person of ordinary skill in the art and is not to be limited to a special or customized meaning. The term specifically may refer, without limitation, to a device or combination of devices capable and/or configured for performing at least one computing operation and/or for controlling at least one function of at least one other device, such as of at least one other component of the portable spectrometer device. Specifically, the at least one control unit may be embodied as at least one processor and/or may comprise at least one processor, wherein the processor may be configured, specifically by software programming, for performing one or more operations. The term "processor" as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of a computer or system, and/or, generally, to a device which is configured for performing calculations or logic operations. In particular, the processor may be configured for processing basic instructions that drive the computer or system. As an example, the processor may comprise at least one arithmetic logic unit (ALU), at least one floating-point unit (FPU), such as a math co-processor or a numeric co-processor, a plurality of registers, specifically registers configured for supplying operands to the ALU and storing results of operations, and a memory, such as an L1 and L2 cache memory. In particular, the processor may be a multi-core processor. Specifically, the processor may be or may comprise a central processing unit (CPU). Additionally or alternatively, the processor may be or may comprise a microprocessor, thus specifically the processor's elements may be contained in one single integrated circuitry (IC) chip. Additionally or alternatively, the processor may be or may comprise one or more application-specific integrated circuits (ASICs) and/or one or more field-programmable gate arrays (FPGAs) and/or one or more tensor processing unit (TPU) and/or one or more chip, such as a dedicated machine learning optimized chip, or the like. The processor specifically may be configured, such as by software programming, for performing one or more evaluation operations.

As also outlined above, the portable spectrometer device further comprises at least one status inquiry device configured for retrieving at least one item of status information on a current environmental status of the portable spectrometer device. The term "status inquiry device" as used herein is a broad term and is to be given its ordinary and customary meaning to a person of ordinary skill in the art and is not to be limited to a special or customized meaning. The term specifically may refer, without limitation, to a device or a combination of devices capable of our configured for retrieving the at least one item of status information as outlined above. Specifically, the status inquiry device may comprise at least one of an interface for retrieving the item of status information in an electronic format, such as a data format, such as a wireless or wire bound interface, and/or at least one device configured for generating the item of status information, such as at least one sensor device, as will be outlined in further detail below. The status inquiry device may also fully or partially be integrated into the control unit. Additionally or alternatively, the status inquiry device may comprise one or more devices integrated into the portable spectrometer device, such as one or more integrated sensors.

The term "current environmental status of the portable spectrometer device" as used herein is a broad term and is to be given its ordinary and customary meaning to a person of ordinary skill in the art and is not to be limited to a special or customized meaning. The term specifically may refer, without limitation, to a situation and/or condition in which the portable spectrometer device momentarily is in, i.e. at the moment of inquiry and/or within a predetermined time span around the moment of inquiry. Therein, the term "environmental status" may relate to at least one condition of an environment, specifically a surrounding, in which the portable spectrometer device is in and/or to at least one relationship between the portable device and the surrounding, such as a location and/or an orientation. As an example, the environmental status may refer to at least one of a lighting condition of the environment, a weather condition of the environment, a temperature of the environment, an orientation of the portable spectrometer device in the environment, a location of the portable spectrometer device in the environment, a relative orientation and/or location between the portable spectrometer device, and at least one item in the environment. Further exemplary embodiments will be given below.

The term "retrieving" as used herein is a broad term and is to be given its ordinary and customary meaning to a person of ordinary skill in the art and is not to be limited to a special or customized meaning. The term specifically may refer, without limitation, to a process of providing at least one object, or item to at least one entity. The process may comprise generating the at least one item or object or obtaining the at least one item or object from another source and providing the at least one item or object to the at least one entity. Thus, referring to the retrieving of the at least one item of status information on a current environmental status of the portable spectrometer device, the retrieving may, as an example, comprise obtaining the item of status information from at least one source, such as from at least one external source, e.g. via at least one interface, such as a wireless and/or a wire bond interface, the external source, as an example, may be the Internet. Additionally or alternatively, for retrieving the at least one item of status information, the portable spectrometer device may also comprise one or more sensors or sensing devices for measuring at least one measurable value from which the at least one item of status information on the current environmental status of the portable spectrometer device may be derived, directly or indirectly. Exemplary embodiments of sensor devices will be given below.

The control unit, as outlined above, is configured for automatically triggering at least one reference measurement with the detector device, depending on the fulfillment of at least one predetermined environmental status condition. The term "automatically triggering" as used herein is a broad term and is to be given its ordinary and customary meaning to a person of ordinary skill in the art and is not to be limited to a special or customized meaning. The term specifically may refer, without limitation, to the process of starting an action without the necessity of human interaction, specifically without any human interaction or with only optional human interaction.

Further, the term "reference measurement" as used herein is a broad term and is to be given its ordinary and customary meaning to a person of ordinary skill in the art and is not to be limited to a special or customized meaning. The term specifically may refer, without limitation, to a process of measuring at least one reference value or obtaining at least one item of reference information by measurement. The reference value or item of reference information may then be used for accuracy improvement in a real measurement, e.g. by comparing at least one measurement value obtained in the real measurement with the at least one reference value or item of reference information and/or by correcting for adjusting the measurement value obtained in the real measurement by using the at least one reference value or item of reference information. Reference measurements are widely used in optical measurements such as spectroscopic measurements, e.g. for correcting background light, noise, detector sensitivity and the like.

As outlined above, the at least one reference measurement is automatically triggered, depending on the fulfillment of at least one predetermined environmental status condition. The term "environmental status condition" as used herein is a broad term and is to be given its ordinary and customary meaning to a person of ordinary skill in the art and is not to be limited to a special or customized meaning. The term specifically may refer, without limitation, to a condition of the environment the portable spectrometer device is in and/or a condition of a relationship between the portable spectrometer device and the environment which has been predetermined to be sufficient for performing the reference measurement. As an example, the at least one environmental status condition may be at least one condition that must be fulfilled by the at least one item of status information on the current environmental status of the portable spectrometer device. As an example, the item of status information may be compared with at least one maximum or minimum threshold value, and the condition may be fulfilled and the reference measurement may, as an example, be automatically triggered when the item of status information is above or below the minimum or maximum threshold value, respectively. Additionally or alternatively, the environmental status condition may be fulfilled when the at least one item of status information on the current environmental status of the portable spectrometer device and/or at least one secondary value derived from the at least one item of status information by using a predetermined relationship or function are within at least one predetermined range. Thus, as an example, the control unit may obtain the at least one item of status information on a current environmental status of the portable spectrometer device from the status inquiry device, may optionally transform the at least one item of status information and to at least one secondary value and may then check whether the at least one item of status information and/or the at least one secondary value fulfills the environmental status condition, such as has a predetermined target value or is within a predetermined range. If this environmental status condition is fulfilled, the control unit may automatically trigger, with or without delay, the at least one reference measurement, such as by triggering the detector device to acquire spectral measurement values.

The use of the at least one item of status information on a current environmental status of the portable spectrometer device may, thus, enable the portable spectrometer device to perform reference measurements repeatedly, when the predetermined environmental status condition indicates that the environmental conditions are suited for the at least one reference measurement. The at least one item of status information specifically may be retrieved by using integrated means of the portable spectrometer device.

Specifically, the portable spectrometer device may be or may comprise a mobile communication device. The term "mobile communication device" as used herein is a broad term and is to be given its ordinary and customary meaning to a person of ordinary skill in the art and is not to be limited to a special or customized meaning. The term specifically may refer, without limitation, to a mobile device which is configured for communication by speech and/or electronically. Specifically, the mobile communication device may comprise at least one of: a mobile phone, specifically a smart phone; a smartwatch; a tablet computer; a notebook computer. Specifically, the mobile communication device may comprise at least one user interface such as a display or touchscreen, and preferably at least one camera.

The mobile communication device may have the at least one of the spectrometer unit being integrated therein and being attached thereto. Thus, as an example, the spectrometer unit may be integrated on a back side of the mobile communication device, with at least one spectrometer port enabling light to enter the spectrometer unit, being spectrally separated by the wave-length-selective element and to reach the detector device. The term "spectrometer port" as used herein is a broad term and is to be given its ordinary and customary meaning to a person of ordinary skill in the art and is not to be limited to a special or customized meaning. The term specifically may refer, without limitation, to an opening or window, which may be entirely open or covered by a transparent shield, specifically a shield being fully or partially transparent in the infrared spectral range, which enables the entering of light into the spectrometer unit.

The integration of the spectrometer unit into a mobile communication device, such as a smart phone, provides a large number of advantages. Thus, specifically, typical mobile communication devices such as smart phones comprise a plurality of integrated sensor devices for sensing a large number of values such as position, inclination, acceleration, temperature, magnetic fields, and the like. Further, typical mobile communication devices such as smart phones also comprise sensor devices in the form of at least one camera which may also be used for retrieving and checking environmental conditions. Thus, generally, the portable spectrometer device comprising the at least one mobile communication device may be configured for using at least one integrated sensor device of the mobile communication device as at least a part of the at least one status inquiry device. Exemplary embodiments of integrated sensor devices will be given below.

The portable spectrometer device may comprise a housing, such as the housing of the mobile communication device. The housing may provide for an encapsulation or shell fully or partially surrounding the components of the portable spectrometer device. The housing may be configured for providing protection against mechanical and/or environmental influences onto these components. The housing, as an example, may be made of a rigid material, such as a metallic material and/or a rigid plastic material. Specifically, the portable spectrometer device may be a single device, with only one component, surrounded by the housing and with the spectrometer unit integrated therein. Specifically, the at least the control unit and the status inquiry device, and preferably also the spectrometer unit, may be integrally contained within the housing.

The portable spectrometer device specifically may be an infrared spectrometer or may be configured to act as an infrared spectrometer. Thus, specifically, the portable spectrometer device may be configured for acquiring the at least one item of spectral information at least in the infrared spectral range, specifically in the near infrared spectral range. Thus, as an example, a spectrum in at least a part of the infrared spectral range may be acquired. The term "infrared spectral range" (IR) generally may refer to electromagnetic radiation of 760 nm to 1000 μm, wherein the range of 760 nm to 1.5 μm is usually denominated as "near infrared spectral range" (NIR) while the range from 1.5 u to 15 μm is denoted as "mid infrared spectral range" (MidIR) and the range from 15 μm to 1000 μm as "far infrared spectral range" (FIR). Specifically, light used for the typical purposes of the present invention is light in the infrared (IR) spectral range, more preferred, in the near infrared (NIR) and the mid infrared spectral range (MidIR), especially the light having a wavelength of 1 μm to 5 μm, preferably of 1 μm to 3 μm. Thus, specifically, the spectrometer unit may be an infrared spectrometer unit, specifically a near infrared spectrometer unit.

As outlined above, the spectrometer unit may be integrated into the portable spectrometer device, specifically into a mobile communication device such as a smart phone. Since in mobile communication devices construction space always is an issue, and since movable mechanical parts are often detrimental to the stability of the device, the infrared spectrometer unit specifically may be a shutter-less infrared spectrometer unit. Since the portable spectrometer device may be configured for performing reference measurements only under suitable environmental conditions, the use of a shutter generally is not necessary, since the control unit may be configured for determining whether a predetermined environmental condition is given which allows for an open shutter measurement, also referred to as an open port reference measurement, or whether a predetermined environmental condition is given which allows for a closed shutter measurement, also referred to as a dark reference measurement, and may trigger a corresponding dark reference measurement. The environmental conditions allowing for the respective reference measurements, as an example, may be determined empirically, e.g. in a laboratory, by varying the environmental status in a controlled fashion and determining whether reference measurements are still feasible within a predetermined range of tolerance. Additionally or alternatively, theoretical or semi-empirical considerations may also be used for determining the environmental conditions for the reference measurement.

Thus, generally, the reference measurement may comprise at least one reference measurement selected from the group consisting of: an open port reference measurement and a dark reference measurement. The term "open port reference measurement" as used herein is a broad term and is to be given its ordinary and customary meaning to a person of ordinary skill in the art and is not to be limited to a special or customized meaning. The term specifically may refer, without limitation, to a reference measurement as defined above in which a spectrometer port of the portable spectrometer device is open and in which spectral information on a background of the portable spectrometer device is gathered within its field of view, without pointing the portable spectrometer device or its spectrometer port to a specific object. Specifically, during the open port reference measurement, the spectrometer port may be far away from any potentially reflecting surfaces and/or light sources in the relevant wavelength range, specifically the infrared and more specifically the near infrared spectral range, within the field of view of the portable spectrometer device. Thus, specifically, during an open port reference measurement, no object may be present in front of the spectrometer port and in a field of view of the spectrometer unit within a distance of at least 1 cm, more specifically within a distance of at least 5 cm or even at least 10 cm. The open port reference measurement may comprise switching on at least one light source of the portable spectrometer device while no object is present in the field of view in front of the spectrometer port, such as at least within the distance mentioned above. During the open port measurement, spectral information may be gathered under these conditions, with the light source switched on.

The term "dark reference measurement" as used herein also is a broad term and is to be given its ordinary and customary meaning to a person of ordinary skill in the art and is not to be limited to a special or customized meaning. The term specifically may refer, without limitation, to a reference measurement as defined above in which a light source of the portable spectrometer device is switched off. Further, the dark reference measurement may be performed also with no external light sources, at least within the relevant spectral range, specifically within the infrared spectral range and more specifically within the near infrared spectral range, within the field of view of the portable spectrometer device, such as within a distance of at least 1 cm, more specifically within a distance of at least 5 cm or even at least 10 cm.

As outlined above, the at least one status inquiry device specifically may be or may comprise a status inquiry device which is configured for retrieving the at least one item of status information on the current environmental status of the portable spectrometer device by measurement. Thus, the portable spectrometer device and specifically the at least one status inquiry device may comprise at least one sensor device configured for acquiring at least a part of the at least one item of environmental status information. The at least one sensor device, as outlined above, specifically may be or may comprise at least one sensor device integrated into the portable spectrometer device such as integrated into the mobile communication device such as the smart phone. Thus, one or more integrated sensor devices may be used which are present in the mobile communication device anyway, such as for one or more other purposes.

Generally, and specifically also in the case of the use of a mobile communication device, the status inquiry device may comprise at least one device selected from the group consisting of: a rear camera being positioned on the same side as a spectrometer port of the spectrometer unit in the portable spectrometer device; a front camera being positioned on an opposite side as a spectrometer port of the spectrometer unit in the portable spectrometer device; a location sensor, specifically a GPS sensor; an illumination sensor configured for determining at least one state of illumination, in an environment of the portable spectrometer device, specifically in a field of view of the spectrometer unit; a temperature sensor; a motion sensor, specifically an acceleration sensor; a gyroscopic sensor; a magnetic sensor; a 3D sensor configured for determining at least one geometry of at least one object in proximity of the portable spectrometer device; a material sensor configured for determining at least one material property of at least one object in proximity of the portable spectrometer device. These devices may also include sensors fully or partially comprised of one or more virtual sensors, e.g. at least one virtual sensor which determines the status of the device by indirect means or learning patterns. This can also include user behavior, time of day or other correlatable pieces of information. Many or even all of these devices, specifically sensor devices, are typically integrated in mobile communication devices such as smart phones. Each of said devices is generally configured for providing at least one item of status information on a current environmental status of the portable spectrometer device. Specifically, said devices or one or more or even all of said devices may provide information which may be used for determining whether the environmental status is such that the at least one reference measurement may be triggered. Signals from one or more of the devices may be used in isolation or in combination to determine whether the conditions for the reference measurement are given.

As outlined above, the at least one reference measurement may comprise or be a single reference measurement or may comprise a plurality of reference measurements. Each reference measurement may comprise a single reference measurement step or a plurality of reference measurement steps, such as different types of reference measurements. Further, as also outlined above, the at least one reference measurement may comprise repeated reference measurements. Thus, specifically, the control unit may be configured for repeatedly automatically triggering reference measurements with the detector device. As an example, the control unit may be configured for performing status checks at predetermined points in time. The status checks each may comprise receiving the at least one item of status information on the current environmental status and checking whether the at least one predetermined environmental status condition is fulfilled. The control unit further may be configured for triggering the at least one reference measurement depending on whether the at least one environmental status condition is fulfilled. The status checks may be performed in regular time intervals. However, additionally or alternatively, other predetermined points in time may be given, such as after switch-on of the portable spectrometer device and/or whenever a portable spectrometer function is initiated on the portable spectrometer device, such as on the mobile communication device like e.g. the smart phone.

As outlined above, various environmental conditions may have an influence on the suitability of the circumstances for performing the at least one reference measurement. In case the at least one reference measurement comprises different types of reference measurements, such as at least one open port reference measurement and at least one dark reference measurement, different types of predetermined environmental status conditions may be given for the different types of reference measurements, such as at least one first predetermined environmental status condition for the open port reference measurement and at least one second predetermined environmental status condition for the dark reference measurement. Specifically, the at least one environmental status condition may comprise at least one condition selected from the group consisting of:

a level of ambient light, specifically in the infrared spectral range and more specifically in the near infrared spectral range, is within a predetermined suitable level range for performing a reference measurement, specifically below a predetermined threshold level;

the portable spectrometer device is in a suitable location for performing a reference measurement, specifically in an indoor environment having a low level of ambient light, more specifically a low level of ambient infrared light;

the portable spectrometer device is in a suitable orientation for performing a reference measurement, specifically in orientation not facing towards a light source;

the portable spectrometer device is not faced towards an external light source in the environment of the portable spectrometer device light source;

the portable spectrometer device is not in proximity to an object or pointed to an object;

the portable spectrometer device is located within a pocket;

the portable spectrometer device is at a temperature within a predetermined temperature range suited for a reference measurement;

a temporal temperature change is within a predetermined range suited for a reference measurement;

weather conditions are within a predetermined range suited for a reference measurement;

the portable spectrometer device presently is not used for another function, specifically for a mobile communication function.

As outlined above, various types of items of information status information on a current environmental status of the portable spectrometer device are usable for determining whether suitable conditions for the at least one reference measurements are given. Specifically, the at least one item of status information may comprise at least one item of information selected from the group consisting of: an environmental lighting condition; an item of position information of the portable spectrometer device, specifically an item of position information selected from the group consisting of an absolute position of the portable spectrometer device in at least one dimension and a relative position of the portable spectrometer device in at least one dimension with respect to at least one object; and an item of orientation information of the portable spectrometer device, specifically an item of orientation information selected from the group consisting of an absolute orientation in at least one rotational dimension, and a relative orientation in at least one rotational dimension with respect to at least one object; an item of temperature information representing a current temperature; an item of handling information representing a current mode of handling of the portable spectrometer device by a user, specifically an item of information representing at least one of a use of a display device of the portable spectrometer device, a manual manipulation of the portable spectrometer device by a user and a use of at least one other function of the portable spectrometer device apart from a spectrometer function of the portable spectrometer device; at least one item of information available via at least one network, specifically a wireless network, specifically the Internet, more specifically at least one item of information on a current weather status.

In a further aspect of the present invention, a method of performing reference measurements with a portable spectrometer device is disclosed. The method implies using a portable spectrometer device comprising at least one spectrometer unit, wherein the spectrometer unit comprises at least one wavelength-selective element configured for separating incident light into a spectrum of constituent wavelengths and at least one detector device configured for detecting at least a portion of the constituent wavelengths. The method specifically may imply using the portable spectrometer device according to the present invention, such as according to any one of the embodiments described above and/or according to any one of the embodiments described in further detail below. Thus, for possible details and options of the portable spectrometer device as used in the method, reference may be made to the description of the portable spectrometer device above or below.

The method comprises the following method steps which specifically may be performed in the given order. However, a different order is also possible. The method may further comprise additional method steps which are not listed. Further, one or more or even all of the method steps may be performed only once or repeatedly.

The method comprises the following steps:

i. retrieving, specifically by using at least one status inquiry device of the portable spectrometer device, at least one item of status information on a current environmental status of the portable spectrometer device;

ii. checking, specifically by using at least one control unit of the portable spectrometer device, if at least one environmental status condition for performing at least one reference measurement is fulfilled; and iii. automatically triggering, specifically by using the control unit, at least one reference measurement with the detector device if, in step ii., the environmental status condition is fulfilled.

As outlined above, the method specifically may use the portable spectrometer device according to the present invention, such as according to any one of the embodiments described above and/or according to any one of the embodiments described in further detail below.

As also outlined above, one or more of the method steps may be performed repeatedly. Thus, specifically, method steps i.-iii. may be performed repeatedly, such as in the given order. More-over as an example and as also outlined above, the repetitions may take place in regular time intervals and/or at determinable or predetermined points in time. The predetermined points in time, as an example, may comprise points of time when the portable spectrometer device is started or may comprise points in time when a spectrometer app on the portable spectrometer device, such as a mobile communication device like e.g. a smart phone, is started.

The at least one reference measurement specifically may comprise at least one reference measurement selected from the group consisting of an open port reference measurement and a dark reference measurement. For further definitions and options, reference may be made to the description of the portable spectrometer device as given above.

The method in any of the aspects described herein specifically may be at least partially comput-er-implemented and/or computer-driven, such as by the control unit or a processor of the control unit of the portable spectrometer device. Thus, specifically, the control unit may be configured, by appropriate software configuration, to trigger the retrieving of the at least one item of status information, to perform the checking if the at least one environmental status condition is fulfilled and, further, for automatically triggering the reference measurement.

Thus, in a further aspect, a computer program is disclosed. The computer program comprises instructions which, when the program is executed by the control unit of the portable spectrometer device as disclosed herein, such as according to any one of the embodiments described above and/or according to any one of the embodiments described in further detail below, cause the control unit of the portable spectrometer device to perform the method as disclosed herein, such as according to any one of the embodiments described above and/or according to any one of the embodiments described in further detail below.

In a further aspect, a computer-readable storage medium is disclosed, specifically a non-transitory computer-readable storage medium, comprising instructions which, when the instructions are executed by the control unit of the portable spectrometer device as disclosed herein, such as according to any one of the embodiments described above and/or according to any one of the embodiments described in further detail below, cause the control unit to perform the method as disclosed herein, such as according to any one of the embodiments described above and/or according to any one of the embodiments described in further detail below. As used herein, the term "computer-readable storage medium" specifically may refer to a non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Generally, in a further aspect, a non-transient computer-readable medium is disclosed, including instructions that, when executed by one or more processors, cause the one or more processors to perform the method as disclosed herein, such as according to any one of the embodiments described above and/or according to any one of the embodiments described in further detail below.

The portable spectrometer device and the method as disclosed herein provide a large number of advantages over known devices and methods of similar kind. Specifically, the above-mentioned technical challenges are addressed. Reference measurements may be conducted, such as in regular time intervals and/or at predetermined or determinable points in time, in a reliable fashion, to counter e.g. an offset and/or the effect of drift or other long term changes. Both open port reference measurements and dark reference measurements are feasible.

The portable spectrometer device and the method generally do not require active user interaction or the a priori information to the user that the spectrometer module is in a well-defined state suited for the reference measurement. Specifically, as outlined above, this state might be a state with an open entrance port or spectrometer port far away from any potentially reflecting surface. Additionally or alternatively, the state might be a state in which no light sources in the relevant wavelength range are located within the field of view of the portable spectrometer device. The presence of said state may be checked automatically by checking if the at least one predetermined environmental status condition is fulfilled, and user action or triggering by the user may be avoided. Further, as also outlined above, the reference measurements may be performed without using predefined and integrated reference targets, such as a shutter, since, as an example, the presence of external reference targets may be recognized. Thereby, movable mechanical parts may be avoided in the portable spectrometer device and/or in the spectrometer unit. The spectrometer unit, thus, may be designed without any movable parts such as a shutter.

The invention specifically may be applied to mobile communication devices with a spectrometer unit, such as a spectrometer unit integrated therein. Specifically, as outlined above, many sensors are already available in mobile communication devices such as smart phones, which may be used as the at least one status inquiry device and/or as part of the at least one status inquiry device. Thus, as an example, by applying the sensors already available in a smart phone a sit-uational awareness can be reached, which allows the portable spectrometer device to conduct reference measurements in situations when the conditions for a successful reference measurement are met.

As an example, at least one sensor selected from the following group may be selected as the at least one status inquiry device and/or as a part thereof, for retrieving at least one of the respective items of status information listed for the respective sensor and/or for checking the fulfillment of at least one of the respective predetermined environmental status conditions listed for the respective sensor:

a rear camera of the portable spectrometer device, specifically the smart phone:
identify if the portable spectrometer device, specifically the smartphone, is faced towards a light source;
identify if the portable spectrometer device, specifically the smartphone, is in a highly-lit area, e.g. in an area having an illuminance above a predetermined threshold, which may imply the presence of sunlight and therefore unfavorable amounts of near infrared (NIR) light present;
identify an indoor scene, which implies NIR-less illumination conditions and favorable reference measurement conditions;

and/or
a front camera off the portable spectrometer device, specifically the smart phone:
identify if the portable spectrometer device, specifically the smartphone, is faced towards a light source;
identify if the portable spectrometer device, specifically the smartphone, is in a highly-lit area, e.g. in an area having an illuminance above a predetermined threshold, which may imply the presence of sunlight and therefore unfavorable amounts of near infrared (NIR) light present;
identify an indoor scene, which may imply NIR-less illumination conditions and favorable reference measurement conditions, specifically for performing an open port measurement and/or a dark reference measurement;

and/or
a proximity detector:
identify if the portable spectrometer device, specifically the smartphone, is in proximity to a material, to a face or to a surface, which may indicate that an open port, reference measurement is not possible, wherein, however, a dark reference measurement may be possible;

and/or
a 3D imaging system:
identify if the portable spectrometer device, specifically the smart phone, is in proximity to a material or face;

and/or
an inertial measurement system
identify if the portable spectrometer device, specifically the smart phone, is in a pocket;

and/or
a GPS sensor:
identify if the portable spectrometer device, specifically the smart phone, is located in an indoor location and/or in a shaded area, by looking at a signal strength of a GPS signal;

and/or
a temperature sensor:
identify if the portable spectrometer device, specifically the smart phone, is in contact with a body such as a human body;
identify if a strong temporal temperature shift is present and/or a heat buildup is present in at least one part of the portable spectrometer device, which might result in a temperature change during an open port or a dark reference measurement and therefore is detrimental for at least one of these reference measurements;

and/or a display on/display off status:

identify if the portable spectrometer device, specifically the smart phone, is held in hand by a user;

and/or a phone call status of the portable spectrometer device, specifically the smart phone, such as at least one of a use of a loudspeaker, a use of a headset and the portable spectrometer device being held to a face:

identify if the portable spectrometer device, specifically the smart phone, is likely to be in proximity to a material or a face;

and/or online information, such as a weather report, e.g. online information retrieved via at least one wireless or wire bound interface:

identify if an illumination by the sun can be expected, since most artificial lighting sce-narios have almost no infrared content, such as near infrared content and/or SWIR content, e.g. scenes which are lit by LED lighting.

As outlined above, various combinations from said list of possible sensors as well as possible items of status information and/or environmental status conditions are feasible. Further, the fulfillment of various types of environmental status conditions may be derived from the sensor signals, as outlined above, from which the suitability of a present situation for at least one reference measurement is given, such as for at least one open port reference measurement and/or for at least one dark reference measurement.

As an example, the environmental status conditions as listed in Table 1 may be predetermined for checking the suitability of a situation for open port, reference measurements and/or for dark reference measurements. Again, arbitrary combinations and/or subgroups of these items of status information and the respective environmental status conditions are also feasible.

TABLE 1

Exemplary items of status information on a current environmental status of the portable spectrometer device, specifically the smart phone, and the resulting fulfillment or non-fulfillment of respective environmental status conditions for open port, reference measurements and dark reference measurements.

| Status/item of status information on a current environmental status: | Environmental status condition 1: Open port, reference measurement possible? | Environmental status condition 1: Dark reference measurement possible? |
| --- | --- | --- |
| faced towards light source | No | No |
| highly lit area (e.g. >10 kLux) | No | No |
| dimly lit area (NIR present) | No | No |
| dimly lit (NIR not present) | Yes | Yes |
| indoor | Yes | Yes |
| in pocket | No | Yes |
| in proximity to a material or face | No | Yes |
| temperature change of sensor expected | No | No |
| highly lit area, but sunlight can be excluded due to weather report | Yes | Yes |

Other reference measurements or system status measurements are sometimes necessary and parts of the reference measurements can be split up and conducted at different times if conditions are met. Thus, generally, the present invention may provide for a simple way of performing reference measurements with a portable spectrometer device, under well-defined conditions, and without the necessity of user interaction. Further, the use of mobile communication devices such as smart phones may provide for a large number of sensor devices, which may be used, alone or in combination, as the at least one status inquiry device for reliably checking whether the conditions for reference measurements are fulfilled, without the necessity of actively providing for these conditions, such as by providing shutters or other well-defined experimental setups for reference measurements.

Summarizing and without excluding further possible embodiments, the following embodiments may be envisaged:

Embodiment 1: A portable spectrometer device for acquiring at least one item of spectral information, the portable spectrometer device comprising at least one spectrometer unit, the spectrometer unit comprising at least one wavelength-selective element configured for separating incident light into a spectrum of constituent wavelengths and at least one detector device configured for detecting at least a portion of the constituent wavelengths, the portable spectrometer device further comprising at least one control unit and at least one status inquiry device configured for retrieving at least one item of status information on a current environmental status of the portable spectrometer device, wherein the control unit is configured for automatically triggering at least one reference measurement with the detector device, depending on the fulfillment of at least one predetermined environmental status condition.

Embodiment 2: The portable spectrometer device according to the preceding embodiment, wherein the portable spectrometer device comprises a mobile communication device with the spectrometer unit being at least one of integrated therein and attached thereto, specifically a mobile communication device selected from the group consisting of: a mobile phone, specifically a smart phone; a tablet computer; a notebook.

Embodiment 3: The portable spectrometer device according to the preceding embodiment, wherein the portable spectrometer device is configured for using at least one integrated sensor device of the mobile communication device as at least a part of the at least one status inquiry device.

Embodiment 4: The portable spectrometer device according to any one of the preceding embodiments, further comprising at least one light source, specifically at least one light source, for illuminating at least one object to be analyzed by spectrometry with light, more specifically with infrared light, and more specifically with near infrared light.

Embodiment 5: The portable spectrometer device according to any one of the preceding embodiments, wherein the portable spectrometer device comprises a housing, wherein the at least the control unit and the status inquiry device, and preferably also the spectrometer unit, are integrally contained within the housing.

Embodiment 6: The portable spectrometer device according to any one of the preceding embodiments, wherein the portable spectrometer device is configured for acquiring the at least one item of spectral information at least in the infrared spectral range, specifically in the near infrared spectral range, specifically with the spectrometer unit being an infrared spectrometer unit.

Embodiment 7: The portable spectrometer device according to any one of the preceding embodiments, wherein the infrared spectrometer unit is a shutter-less infrared spectrometer unit.

Embodiment 8: The portable spectrometer device according to any one of the preceding embodiments, wherein the reference measurement comprises at least one reference measurement selected from the group consisting of an open port reference measurement and a dark reference measurement.

Embodiment 9: The portable spectrometer device according to any one of the preceding embodiments, wherein the status inquiry comprises at least one sensor device configured for acquiring at least a part of the at least one item of environmental status information.

Embodiment 10: The portable spectrometer device according to any one of the preceding embodiments, wherein the status inquiry device comprises at least one device selected from the group consisting of: a rear camera being positioned on the same side as a spectrometer port of the spectrometer unit in the portable spectrometer device; a front camera being positioned on an opposite side as a spectrometer port of the spectrometer unit in the portable spectrometer device; a location sensor, specifically a GPS sensor; an illumination sensor configured for determining at least one state of illumination, in an environment of the portable spectrometer device, specifically in a field of view of the spectrometer unit; a temperature sensor; a motion sensor, specifically an acceleration sensor; a gyroscopic sensor; a magnetic sensor; a 3D sensor configured for determining at least one geometry of at least one object in proximity of the portable spectrometer device; a material sensor configured for determining at least one material property of at least one object in proximity of the portable spectrometer device; at least one virtual sensor.

Embodiment 11: The portable spectrometer device according to any one of the preceding embodiments, wherein the control unit is configured for repeatedly automatically triggering reference measurements with the detector device.

Embodiment 12: The portable spectrometer device according to the preceding embodiment, wherein the control unit is configured for performing status checks at predetermined points in time, wherein the status checks each comprise receiving the at least one item of status information on the current environmental status and checking whether the at least one predetermined environmental status condition is fulfilled, and wherein the control unit further is configured for triggering the at least one reference measurement depending on whether the at least one environmental status condition is fulfilled.

Embodiment 13: The portable spectrometer device according to the preceding embodiment, wherein the status checks are performed in regular time intervals.

Embodiment 14: The portable spectrometer device according to any one of the preceding embodiments, wherein the at least one environmental status condition comprises at least one condition selected from the group consisting of:

a level of ambient light, specifically in the infrared spectral range and more specifically in the near infrared spectral range, is within a predetermined suitable level range for performing a reference measurement, specifically below a predetermined threshold level;

the portable spectrometer device is in a suitable location for performing a reference measurement, specifically in an indoor environment having a low level of ambient light, more specifically a low level of ambient infrared light;

the portable spectrometer device is in a suitable orientation for performing a reference measurement, specifically in orientation not facing towards a light source;

the portable spectrometer device is not faced towards an external light source, i.e. a light source in an environment of the portable spectrometer device;

the portable spectrometer device is not in proximity to an object or pointed to an object;

the portable spectrometer device is located within a pocket;

the portable spectrometer device is at a temperature within a predetermined temperature range suited for a reference measurement;

a temporal temperature change is within a predetermined range suited for a reference measurement;

weather conditions are within a predetermined range suited for a reference measurement;

the portable spectrometer device presently is not used for another function, specifically for a mobile communication function.

Embodiment 15: The portable spectrometer device according to any one of the preceding embodiments, wherein the at least one item of status information comprises at least one item of information selected from the group consisting of: an environmental lighting condition; an item of position information of the portable spectrometer device, specifically an item of position information selected from the group consisting of an absolute position of the portable spectrometer device in at least one dimension and a relative position of the portable spectrometer device in at least one dimension with respect to at least one object; and item of orientation information of the portable spectrometer device, specifically an item of orientation information selected from the group consisting of an absolute orientation in at least one rotational dimension, and a relative orientation in at least one rotational dimension with respect to at least one object; an item of temperature information representing a current temperature; an item of handling information representing a current mode of handling of the portable spectrometer device by a user, specifically an item of information representing at least one of a use of a display device of the portable spectrometer device, a manual manipulation of the portable spectrometer device by a user and a use of at least one other function of the portable spectrometer device apart from a spectrometer function of the portable spectrometer device; at least one item of information available via at least one network, specifically a wireless network, specifically the Internet, more specifically at least one item of information on a current weather status.

Embodiment 16: A method of performing reference measurements with a portable spectrometer device, the portable spectrometer device comprising at least one spectrometer unit, the spectrometer unit comprising at least one wavelength-selective element configured for separating incident light into a spectrum of constituent wavelengths and at least one detector device configured for detecting at least a portion of the constituent wavelengths, the method comprising:

i. retrieving, specifically by using at least one status inquiry device of the portable spectrometer device, at least one item of status information on a current environmental status of the portable spectrometer device;

ii. checking, specifically by using at least one control unit of the portable spectrometer device, if at least one environmental status condition for performing at least one reference measurement is fulfilled; and iii. automatically triggering, specifically by using the control unit, at least one reference measurement with the detector device if, in step ii., the environmental status condition is fulfilled.

Embodiment 17: The method according to the preceding claim, wherein the method uses the portable spectrometer device according to any one of the preceding embodiments referring to a portable spectrometer device.

Embodiment 18: The method according to any one of the preceding embodiments referring to a method, wherein method steps i.-iii. are performed repeatedly, specifically in regular time intervals and/or at determinable or predetermined points in time.

Embodiment 19: The method according to any one of the preceding embodiments referring to a method, wherein the at least one reference measurement comprises at least one reference measurement selected from the group consisting of an open port reference measurement and a dark reference measurement.

Embodiment 20: The method according to anyone of the preceding embodiments referring to a method, wherein the method is at least partially computer-implemented.

Embodiment 21: A computer program comprising instructions which, when the program is executed by the control unit of the portable spectrometer device according to any one of the preceding embodiments referring to a portable spectrometer device, cause the control unit to perform the method according to any one of the preceding embodiments referring to a method.

Embodiment 22: A computer-readable storage medium comprising instructions which, when the instructions are executed by the control unit of the portable spectrometer device according to any one of the preceding embodiments referring to a portable spectrometer device, cause the control unit to perform the method according to any one of the preceding embodiments referring to a method.

Embodiment 23: A non-transient computer-readable medium including instructions that, when executed by one or more processors, cause the one or more processors to perform the method according to any one of the preceding embodiments referring to a method.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restrict-ed by the preferred embodiments. The embodiments are schematically depicted in the Figures. Therein, identical reference numbers in these Figures refer to identical or functionally comparable elements.

In the Figures:

FIG. 1 shows a cross-section of an embodiment of a portable spectrometer device configured for acquiring at least one item of spectral information on an object; and FIG. 2 shows a flow chart of an embodiment of a method of performing reference measurements with a portable spectrometer device, such as the portable spectrometer device. Depicted in FIG. 1.

DETAILED DESCRIPTION OF THE
EMBODIMENTS

In FIG. 1, a schematic cross-sectional view of a portable spectrometer device 110 for acquiring at least one item of spectral information on an object 112 is shown. In the present embodiment, the portable spectrometer device 110 may specifically be embodied as a mobile communication device 114, more specifically as a smart phone 116. The smart phone 116 may have a plurality of sensor devices 118 integrated therein, as usually is the case with typical smart phones, 116, such as one or more of a front camera 120, a rear camera 122 and one or more sensors like inclinations sensors, GPS sensors, acceleration sensors, gyroscopic sensors, temperature sensors and the like. For possible sensor devices 118, reference may be made to the description given above.

The portable spectrometer device 110, such as the smart phone 116, may further comprise one or more user interfaces 126, such as one or more displays or touchscreens. Further, the portable spectrometer device 110 may comprise one or more electronic interfaces 128, such as one or more wireless and/or wire bound interfaces for data exchange with other devices and/or with one or more networks.

The portable spectrometer device 110 further comprises at least one spectrometer unit 130, which specifically may be integrated into a housing 132 of the portable spectrometer device 110. The spectrometer unit 130 comprises at least one wavelength-selective element 134 configured for separating incident light into a spectrum of constituent wavelengths. Thus, the light which is one or more of an emitted, reflected or scattered from the object 112 and which is to be analyzed for acquiring the at least one item of spectral information by the portable spectrometer device 110 may be spectrally separated by the wavelength-selective element 134, before being detected by at least one detector device 136. Specifically, the at least one wavelength-selective element 134 may comprise at least one length variable filter having varying spectral transmission properties over its lateral extension. The detector device 136 may, as an example, comprise an array of light-sensitive elements which may be located beneath the length variable filter, such that each of the light-sensitive elements detects a different portion of the spectrum of the incident light. The spectrometer unit 130 may optionally comprise additional elements, such as light concentrators, lenses, or the like. Light from the object 112 may enter the spectrometer unit 130 through at least one spectrometer port 138, such as at least one opening in the housing 132 which may fully or partially be covered by a transparent material being at least partially transparent for the light to be detected, such as infrared light, more specifically light in the near infrared spectral range.

The portable spectrometer device 110 may further comprise at least one light source 140, the light source 140 may be configured, as depicted in FIG. 1, for illuminating the object 112 with light 142. As an example, the light source 140 may be or may comprise an infrared light source, such as a light source emitting in the near infrared spectral range. Besides the at least one light source 140, the portable spectrometer device 110 may comprise further light sources 144, e.g., one or more light sources 144 used in conjunction with the cameras. 120, 122. The light sources 120, 122 may emit in a different spectral range, than the light source 140 used for spectrometry purposes, such as in the visible spectral range.

The portable spectrometer device 110 further comprises at least one control unit 146. The control unit 146, as an example, may comprise a processor. The control unit 146, as an example, may be a centralized or decentralized control unit configured for controlling one or more or even all of the functions of the portable spectrometer device 110, specifically of the mobile communication device 114 and more specifically of the smart phone 116. The portable spectrometer device and, specifically the control unit 146 may further comprise one or more data storage devices. The control unit 146 may be connected, e.g., to all of the elements listed above and may be able to unidirectionally and/or bidirectionally communicate with these elements, e.g. for retrieving data and/or for providing control commands.

The portable spectrometer device comprises at least one status inquiry device 148. the status inquiry device 148 is configured for retrieving at least one item of status information on a current environmental status of the portable spectrometer device 110, such as a status describing a state of the environment, the portable spectrometer device 110 is in, like e.g. a temperature or a temporal change on temporal gradient of the temperature of the environment, and illumination of the environment, or the like, and/or a relationship between the portable spectrometer device 110 and at least a part of the environment, such as a location of the portable spectrometer device 110, an orientation of the portable spectrometer device 110 or a relative position or orientation of the portable spectrometer device 110 and at least one object in the environment. The status inquiry device 148 specifically may comprise at least one of the sensor devices 118, thereby being capable of directly or indirectly retrieving the item of status information by measurement, such as the illumination and/or the temperature. Thus, the status inquiry device 148 may make use of at least one of an integrated sensor 124 and a camera 120, 122. Additionally or alternatively, the status inquiry device may also be configured for retrieving the at least one item of status information via at least one network, such as the Internet. For this purpose, the status inquiry device 148 may also make use of the at least one electronic interface 128, which also may be part of the status inquiry device 148.

As also outlined above, the control unit 146 is configured for automatically triggering at least one reference measurement, depending on the fulfillment of at least one predetermined environmental status condition. The reference measurement is performed by using the detector device 136.

Thus, as an example, the control unit 146 may, firstly, obtain the at least one item of status information on the current environmental status of the portable spectrometer device 110 from the at least one status inquiry device 148. Thus, as an example, by using a brightness sensor of the portable spectrometer device 110, at least one item of information on an environmental brightness, may be retrieved and evaluated by the control unit 146. As an example, the environmental brightness might be compared with one or more thresholds, in order to determine whether the portable spectrometer device is located in a highly lit area, such as with a threshold of 10 kLux. in case the environmental brightness is above, the threshold, as an example, the control unit 146 may determine that neither an environmental status condition for performing an open port, reference measurement, with the light source 140 switched on, is fulfilled, nor an environmental status condition for performing a dark reference measurement, with the light source 140 switched off. Combinations of environmental status conditions are also feasible, wherein, as an example, for suitable conditions of the reference measurement, a plurality of environmental status conditions may have to be fulfilled simultaneously. For further examples of environmental status conditions, reference may be made to the description given above.

In FIG. 2, an exemplary embodiment of a method of performing reference measurements with a portable spectrometer device 110, such as the portable spectrometer device 110 as described above in the context of FIG. 1, is shown as a schematic flow chart. The method comprises the following method steps, which specifically may be performed in the given order. A different order, however, is also feasible. Further, as will be outlined in further detail below, one or more of the method steps or even all of the method steps may be performed repeatedly. Further, the method may comprise additional method steps, which are not listed here.

The method, as an example, may be run continuously, whenever the portable spectrometer device 110 and/or a software app driving the portable spectrometer device 110, e.g. on a mobile communication device 114, is running. Other options, however, are also feasible.

In a first method step, step i., denoted by reference number 210, at least one item of status information on a current environmental status of the portable spectrometer device 110 is retrieved, e.g., by using the at least one status inquiry device 148. Step 210 may comprise retrieving a single item of status information or a plurality of items of status information.

In a further method step, step ii., denoted by reference number 212, the fulfillment of at least one environmental status condition for performing a reference measurement is fulfilled. In case different types of reference measurements are to be performed, such as an open port reference measurement and a dark reference measurement, different types of environmental status conditions may be given. Further, as also outlined above, the at least one environmental status condition may also comprise a plurality of environmental status conditions which have to be fulfilled simultaneously. Thus, as an example, the environmental status condition may exclude the presence of one or more light sources, specifically light sources emitting in the infrared spectral range, in the field of view 150 of one or both of the cameras 120, 122, in order to enable an open port reference measurement and/or a dark reference measurement.

In case the at least one environmental status condition for performing the at least one reference measurement is not fulfilled, the method, which may be entirely or partially computer controlled, may automatically determine that the environmental conditions are not suited for performing the at least one reference measurement. In this branch, denoted by "N" in FIG. 2, the method may step back, optionally after a waiting time 214, to step 210.

If, on the other hand, the at least one environmental status condition or the combination of a plurality of environmental status conditions are fulfilled, denoted by branch "Y" in FIG. 2, the method may determine that the environmental status conditions are suited for performing the at least one reference measurement. In this case, the method may step forward to a step of automatically triggering at least one reference measurement to be performed with the detector device 136. This method step, step iii., in FIG. 2, is denoted by reference number 216.

After performing the at least one reference measurement in step 216, the method may step back, optionally after a waiting time 214, to step 210. Thereby, repeated reference measurements may be performed at predetermined points in time, such as in regular time intervals. Other predetermined points in time are also feasible.

The method as depicted in FIG. 2 constitutes a rather simple embodiment of the method as proposed herein. It shall be noted that other embodiments are feasible. Thus, as an example, specifically in case different types of reference measurements are to be performed repeatedly, it may turn out in step 212 that the at least one environmental status condition for a first type of reference measurement may be fulfilled, whereas at least one further environmental status condition for a second type of reference measurement may not be fulfilled. In this case, the method may step forward with the automatically triggering the first type of reference measurement in step 216, whereas the second type of reference measurement is not performed in the present case. It may also be feasible to run separate methods for the different types of reference measurements.

LIST OF REFERENCE NUMBERS

110 Portable spectrometer device
112 Object
114 Mobile communication device
116 Smart phone
118 Sensor device
120 Front camera
122 Rear camera
124 Sensor
126 User interface
128 Electronic interface
130 Spectrometer unit
132 Housing
134 Wavelength-selective element
136 Detector device
138 Spectrometer port
140 Light source
142 Light
144 Further light source
146 Control unit
148 Status inquiry device
150 Field of view
210 Retrieving item of status information
212 Checking fulfillment of environmental status condition
214 Waiting time
216 Automatically triggering reference measurement

The invention claimed is:

1. A portable spectrometer device for acquiring at least one item of spectral information, the portable spectrometer device comprising at least one spectrometer unit, the spectrometer unit comprising at least one wavelength-selective element configured for separating incident light into a spectrum of constituent wavelengths and at least one detector device configured for detecting at least a portion of the constituent wavelengths, the portable spectrometer device further comprising at least one control unit and at least one status inquiry device configured for retrieving at least one item of status information on a current environmental status of the portable spectrometer device, wherein the environ-mental status refers to at least one of a lighting condition of the environment, a weather condition of the environment, a temperature of the environment, an orientation of the portable spectrometer device in the environment, a location of the portable spectrometer device in the environment, and a relative orientation and/or location between the portable spectrometer device and at least one item in the environment, wherein the control unit is configured for automatically triggering at least one reference measurement with the detector device, depending on the fulfillment of at least one predetermined environmental status condition.

2. The portable spectrometer device according to claim 1, wherein the portable spectrometer device comprises a mobile communication device with the spectrometer unit being at least one of integrated therein and attached thereto, wherein the portable spectrometer device is configured for using at least one integrated sensor device of the mobile communication device as at least a part of the at least one status inquiry device.

3. The portable spectrometer device according to claim 1, further comprising at least one light source.

4. The portable spectrometer device according to claim 1, wherein the portable spectrometer device is configured for acquiring the at least one item of spectral information at least in the infrared spectral range.

5. The portable spectrometer device according to claim 1, wherein the infrared spectrometer unit is a shutter-less infrared spectrometer unit.

6. The portable spectrometer device according to claim 1, wherein the reference measurement comprises at least one reference measurement selected from the group consisting of an open port reference measurement and a dark reference measurement.

7. The portable spectrometer device according to claim 1, wherein the status inquiry device comprises at least one device selected from the group consisting of: a rear camera being positioned on the same side as a spectrometer port of the spectrometer unit in the portable spectrometer device; a front camera being positioned on an opposite side as a spectrometer port of the spectrometer unit in the portable spectrometer device; a location sensor; an illumination sensor configured for determining at least one state of illumination in an environment of the portable spectrometer device; a temperature sensor; a motion sensor; a gyroscopic sensor; a magnetic sensor; a 3D sensor configured for determining at least one geometry of at least one object in proximity of the portable spectrometer device; a material sensor configured for determining at least one material property of at least one object in proximity of the portable spectrometer device; and at least one virtual sensor which determines the status of the device by indirect means or learning patterns.

8. The portable spectrometer device according to claim 1, wherein the control unit is configured for repeatedly automatically triggering reference measurements with the detector device, wherein the control unit is configured for performing status checks at predetermined points in time, wherein the status checks each comprise receiving the at least one item of status information on the current environmental status and checking whether the at least one predetermined environmental status condition is fulfilled, and wherein the control unit further is configured for triggering the at least one reference measurement depending on whether the at least one environmental status condition is fulfilled.

9. The portable spectrometer device according to claim 1, wherein the at least one environmental status condition comprises at least one condition selected from the group consisting of:

a level of ambient light is within a predetermined suitable level range for performing a reference measurement;

the portable spectrometer device is in a suitable location for performing a reference measurement;

the portable spectrometer device is in a suitable orientation for performing a reference measurement;

the portable spectrometer device is not faced towards an external light source;

the portable spectrometer device is not in proximity to an object or pointed to an object;

the portable spectrometer device is located within a pocket;

the portable spectrometer device is at a temperature within a predetermined temperature range suited for a reference measurement;

a temporal temperature change is within a predetermined range suited for a reference measurement;

weather conditions are within a predetermined range suited for a reference measurement; and the portable spectrometer device presently is not used for another function.

10. The portable spectrometer device according to claim 1, wherein the at least one item of status information comprises at least one item of information selected from the group consisting of: an environmental lighting condition; an item of position information of the portable spectrometer device; and item of orientation information of the portable spectrometer device; an item of temperature information representing a current temperature; an item of handling information representing a current mode of handling of the portable spectrometer device by a user; and at least one item of information available via at least one network.

11. A method of performing reference measurements with a portable spectrometer device, the portable spectrometer device comprising at least one spectrometer unit, the spectrometer unit comprising at least one wavelength-selective element configured for separating incident light into a spectrum of constituent wavelengths and at least one detector device configured for detecting at least a portion of the constituent wavelengths, the method comprising:

i. retrieving at least one item of status information on a current environmental status of the portable spectrometer device, wherein the environmental status refers to at least one of a lighting condition of the environment, a weather condition of the environment, a temperature of the environment, an orientation of the portable spectrometer device in the environment, a location of the portable spectrometer device in the environment, and a relative orientation and/or location between the portable spectrometer device and at least one item in the environment;

ii. checking if at least one environmental status condition for performing at least one reference measurement is fulfilled; and iii. automatically triggering at least one reference measurement with the detector device if, in step ii., the environmental status condition is fulfilled.

12. The method according to claim 11, wherein the method steps i.-iii. are performed repeatedly.

13. The method according to claim 11, wherein the at least one reference measurement comprises at least one reference measurement selected from the group consisting of an open port reference measurement and a dark reference measurement.

14. A computer program comprising instructions which, when the program is executed by a control unit of a portable spectrometer device, cause the control unit to perform the method according to claim 11.

15. A computer-readable storage medium comprising instructions which, when the instructions are executed by a control unit of a portable spectrometer device, cause the control unit to perform the method according to claim 11.

\* \* \* \* \*